United States Patent
Laskaris

(10) Patent No.: US 6,605,886 B2
(45) Date of Patent: Aug. 12, 2003

(54) HIGH TEMPERATURE SUPERCONDUCTOR SYNCHRONOUS ROTOR COIL SUPPORT INSULATOR

(75) Inventor: Evangelos Trifon Laskaris, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/917,687

(22) Filed: Jul. 31, 2001

(65) Prior Publication Data

US 2003/0102770 A1 Jun. 5, 2003

(51) Int. Cl.[7] .................. H02K 3/46; H02K 1/00; H02K 3/00
(52) U.S. Cl. .................. 310/270; 310/40 R; 310/179
(58) Field of Search .................. 310/179, 40 R, 310/10, 370

(56) References Cited

U.S. PATENT DOCUMENTS

| | | | | | |
|---|---|---|---|---|---|
| 3,195,084 | A | * | 7/1965 | Book | 336/60 |
| 3,416,111 | A | * | 12/1968 | Bogner | 336/60 |
| 3,444,307 | A | * | 5/1969 | Kafka | 174/15.5 |
| 3,514,730 | A | * | 5/1970 | Kassner | 335/216 |
| 3,983,427 | A | * | 9/1976 | Ulke | 310/61 |
| 3,991,587 | A | * | 11/1976 | Laskaris | 62/50.7 |
| 3,991,588 | A | * | 11/1976 | Laskaris | 62/50.7 |
| 4,018,059 | A | * | 4/1977 | Hatch | 62/50.7 |
| 4,101,793 | A | * | 7/1978 | Berthet et al. | 310/52 |
| 4,164,126 | A | * | 8/1979 | Laskaris et al. | 62/50.7 |
| 4,207,745 | A | * | 6/1980 | Pouillange | 62/50.7 |
| 4,275,320 | A | * | 6/1981 | Baumann et al. | 310/52 |
| 4,289,985 | A | * | 9/1981 | Popov et al. | 310/61 |
| 4,400,226 | A | * | 8/1983 | Horrigan | 156/56 |
| 4,862,023 | A | * | 8/1989 | Laumond et al. | 310/54 |
| 5,461,873 | A | * | 10/1995 | Longsworth | 62/51.1 |
| 5,532,663 | A | | 7/1996 | Herd et al. | 335/216 |
| 5,548,168 | A | * | 8/1996 | Laskaris et al. | 310/52 |
| 5,672,921 | A | | 9/1997 | Herd et al. | 310/52 |
| 5,774,032 | A | | 6/1998 | Herd et al. | 335/216 |
| 5,777,420 | A | * | 7/1998 | Gamble et al. | 310/261 |
| 5,798,678 | A | | 8/1998 | Manlief et al. | 335/216 |
| 5,953,224 | A | | 9/1999 | Gold et al. | 363/98 |
| 5,986,380 | A | * | 11/1999 | Kaminski et al. | 310/270 |
| 6,066,906 | A | | 5/2000 | Kalsi | 310/179 |
| 6,140,719 | A | | 10/2000 | Kalsi | 310/52 |
| 6,169,353 | B1 | | 1/2001 | Driscoll et al. | 310/261 |
| 6,173,577 | B1 | | 1/2001 | Gold | 62/51.1 |
| 6,412,289 | B1 | * | 7/2002 | Laskaris et al. | 62/50.7 |
| 6,489,701 | B1 | * | 12/2002 | Gamble et al. | 310/179 |
| 6,515,394 | B2 | * | 2/2003 | Ueda et al. | 310/208 |
| 2002/0125787 | A1 | | 9/2002 | Howard et al. | |
| 2003/0011253 | A1 | | 1/2003 | Kalsi et al. | |
| 2003/0011273 | A1 | | 1/2003 | Kalsi et al. | |
| 2003/0011452 | A1 | | 1/2003 | Snitchler et al. | |

\* cited by examiner

Primary Examiner—Nestor Ramirez
Assistant Examiner—Pedro J. Cuevas
(74) Attorney, Agent, or Firm—Nixon & Vanderhye P.C.

(57) ABSTRACT

A rotor having a superconducting coil winding is disclosed having a rotor core having at least one conduit extending through the core; at least one tension rod extending between the pair of side sections of the coil winding and through said at least one conduit of the rotor; and an insulator in the conduit thermally separating the tension rod from the rotor.

16 Claims, 8 Drawing Sheets

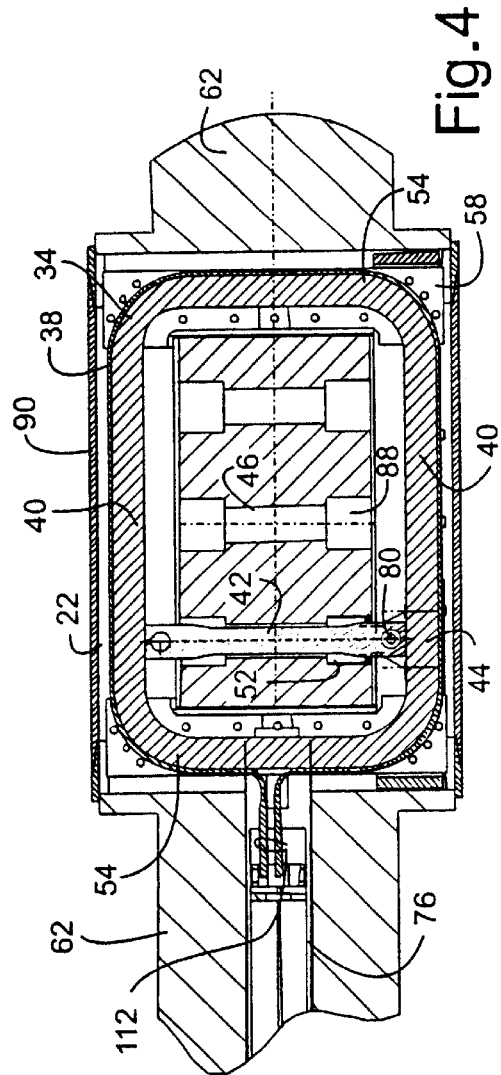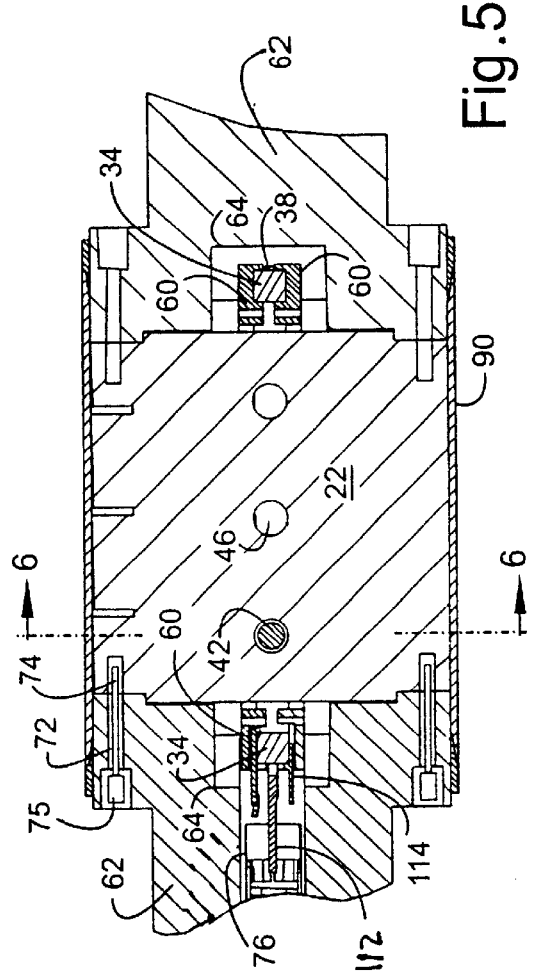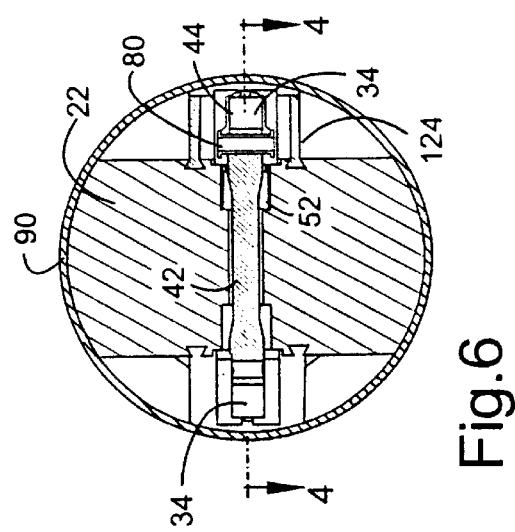

HIGH TEMPERATURE SUPERCONDUCTOR SYNCHRONOUS ROTOR COIL SUPPORT INSULATOR

RELATED APPLICATIONS

This application is related to U.S. patent application Ser. No. 09/855,026, filed May 15, 2001, and incorporated by reference in its entirety herein.

BACKGROUND OF THE INVENTION

The present invention relates generally to a superconducting coil in a synchronous rotating machine. More particularly, the present invention relates to a support structure for superconducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, superconducting (SC) coil windings have been developed for rotors. SC windings have effectively no resistance and are highly advantageous rotor coil windings.

Iron-core rotors saturate at an air-gap magnetic field strength of about 2 Telsa. Known superconducting rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core superconducting rotors require large amounts of superconducting wire. The large amounts of SC wire add to the number of coils required, the complexity of the coil supports, and the cost of the SC coil windings and rotor.

High temperature SC coil field windings are formed of superconducting materials that are brittle, and must be cooled to a temperature at or below a critical temperature, e.g., 27° K., to achieve and maintain superconductivity. The SC windings may be formed of a high temperature superconducting material, such as a BSCCO ($Bi_xSr_xCa_xCu_xO_x$) based conductor.

Superconducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature. As a result, no iron can be used in the rotor magnetic circuit because of the brittle nature of iron at cryogenic temperatures.

What is needed is a superconducting field winding assemblage for an electrical machine that does not have the disadvantages of the air-core and liquid-cooled superconducting field winding assemblages of, for example, known superconducting rotors.

In addition, high temperature superconducting (HTS) coils are sensitive to degradation from high bending and tensile strains. These coils must undergo substantial centrifugal forces that stress and strain the coil windings. Normal operation of electrical machines involves thousands of start-up and shut-down cycles over the course of several years that result in low cycle fatigue loading of the rotor. Furthermore, the HTS rotor winding should be capable of withstanding 25% over-speed operation during rotor balancing procedures at ambient temperature, and notwithstanding occasional over-speed conditions at cryogenic temperatures during power generation operation. These over-speed conditions substantially increase the centrifugal force loading on the windings over normal operating conditions.

SC coils used as the HTS rotor field winding of an electrical machine are subjected to stresses and strains during cool-down and normal operation. They are subjected to centrifugal loading, torque transmission, and transient fault conditions. To withstand the forces, stresses, strains and cyclical loading, the SC coils should be properly supported in the rotor by a coil support system. These support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy-to-fabricate components.

BRIEF SUMMARY OF THE INVENTION

A coil support structure having tension rods and U-shaped channel housings is disclosed for mounting SC coils inside the vacuum space of a HTS rotor. The tension rods span opposite sides of a coil. Channel housings are attached to both ends of the tension rod and wrap around a side portion of the coil. The coil is supported by the tension rods and channel housings with respect to centrifugal and other forces that act on the coil.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system is useful in integrating the coil support system with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

One embodiment of the invention is a synchronous machine, a rotor comprising: a rotor core having at least one conduit extending through the core; a super-conducting coil winding extending around at least a portion of the rotor core, said coil winding having a pair of side sections on opposite sides of said rotor core; at least one tension rod extending between the pair of side sections of the coil winding and through said at least one conduit of the rotor; and an insulator in the conduit thermally separating the tension rod from the rotor.

A further embodiment of the invention is a method for supporting a super-conducting coil winding on a rotor core of a synchronous machine comprising the steps of:

a. extending a tension rod through a conduit in said rotor core;

b. supporting the tension rod in the conduit by a first insulator tube;

c. inserting a housing over a portion of the coil;

d. attaching an end of the tension rod to the housing.

BRIEF DESCRIPTION OF THE DRAWINGS

The accompanying drawings in conjunction with the text of this specification describe an embodiment of the invention.

FIG. 4 to 6 are schematic cross-sectional views of the HTS rotor shown in FIG. 3.

DETAILED DESCRIPTION OF THE INVENTION

Figure 1:
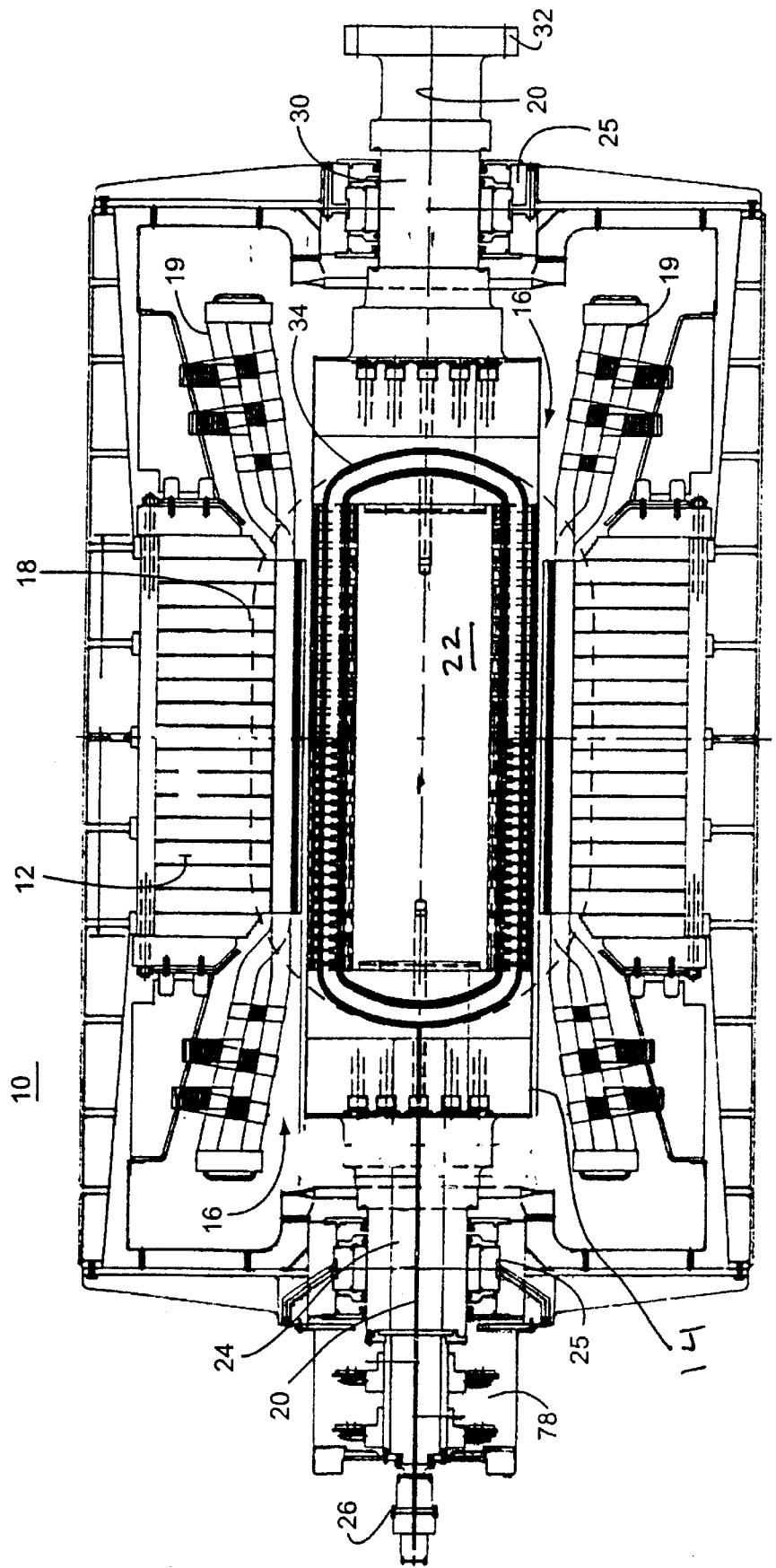
FIG. 1 is a schematic side elevational view of a synchronous electrical machine having a superconducting rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density superconducting machine, the iron core of the rotor is used to reduce the magnetomotive force (MMF), and, thus, minimize the amount of superconducting (SC) coil wire needed for the coil winding. For example, the solid iron rotor core may be magnetically saturated at an air-gap magnetic field strength of about 2 Telsa.

Figure 2:
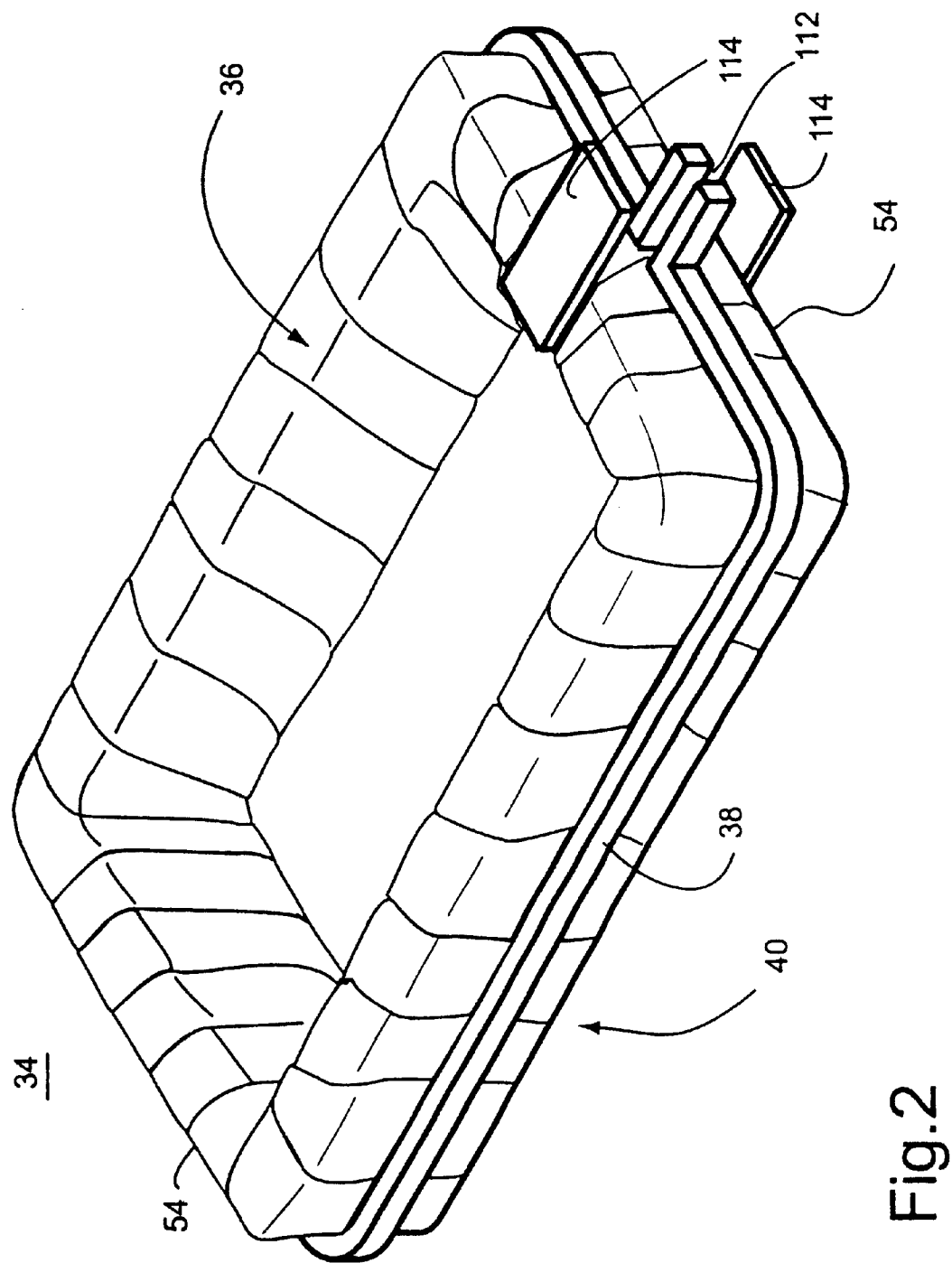
FIG. 2 is a perspective view of an exemplary racetrack superconducting coil winding.

The rotor 14 supports at least one longitudinally-extending, racetrack-shaped, high-temperature superconducting (HTS) coil winding 34 (See FIG. 2). The HTS coil winding may be alternatively a saddle-shape or have some other shape that is suitable for a particular HTS rotor design. A coil support system is disclosed here for a racetrack SC coil winding. The coil support system may be adapted for coil configurations other than a racetrack coil mounted on a solid rotor core.

The rotor includes a collector shaft 24 and a drive end shaft 30 that bracket the rotor core 22, are supported by bearings 25. The end shafts may be coupled to external devices. For example, the end collector shaft 24 has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The collector end shaft 24 also includes a collector 78 for electrically connecting to the rotating SC coil winding. The drive end shaft 30 of the rotor may be driven by a power turbine coupling 32.

FIG. 2 shows an exemplary HTS racetrack field coil winding 34. The SC field winding coils 34 of the rotor includes a high temperature superconducting (SC) coil 36. Each SC coil includes a high temperature superconductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the racetrack SC coil 36.

The dimensions of the racetrack coil are dependent on the dimensions of the rotor core. Generally, each racetrack SC coil encircles the magnetic poles of the rotor core, and is parallel to the rotor axis. The coil windings are continuous around the racetrack. The SC coils form a resistance-free electrical current path around the rotor core and between the magnetic poles of the core. The coil has electrical contacts 114 that electrically connect the coil to the collector 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K., in the SC coil winding needed to promote superconducting conditions, including the absence of electrical resistance in the coil. The cooling passages have an input and output fluid ports 112 at one end of the rotor core. These fluid (gas) ports 112 connect the cooling passages 38 on the SC coil to the cryogen transfer coupling 26.

Each HTS racetrack coil winding 34 has a pair of generally-straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

Figure 3:
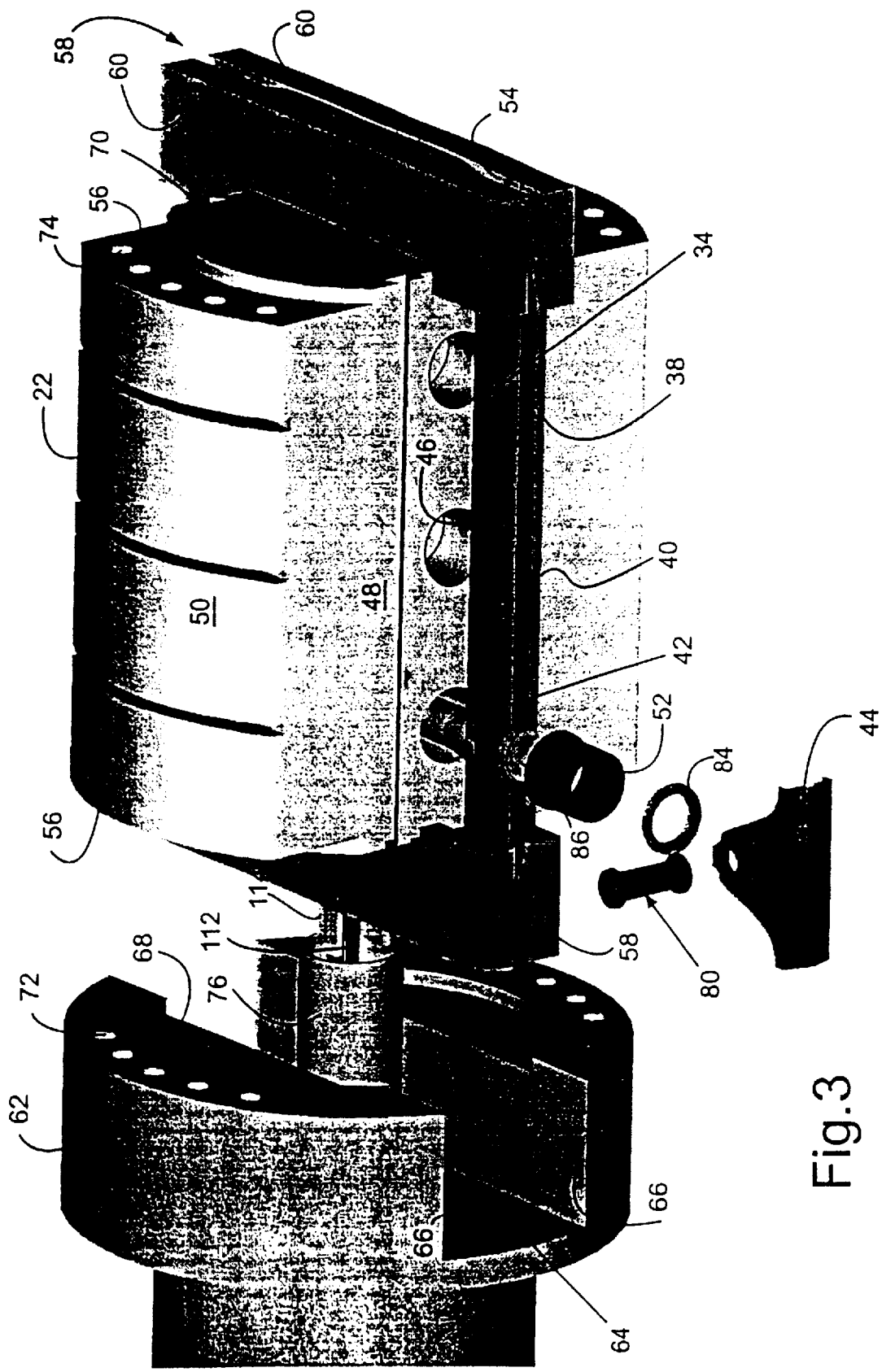
FIG. 3 is an exploded view of the components of a high temperature superconducting (HTS) rotor.

FIG. 3 shows an exploded view of a rotor core 22 and coil support system for a high temperature superconducting coil. The support system includes tension rods 42 connected to U-shaped channel housings. The housings hold and support the side portions 40 of the coil winding 38 in the rotor. While one tension rod and channel housing is shown in FIG. 3, the coil support system will generally include a series of tension rods that each have coil support housings at both ends of the rod. The tension rods and channel housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation. An effective coil structural support is needed to counteract the centrifugal forces. The coil support is needed especially along the side sections 40 of the coil that experience the most centrifugal acceleration. To support the side sections of the coil, the tension rods 42 span between the sections of the coil and attach to the channel housings 44 that grasp opposite side sections of the coil. The tension rods extend through conduits 46, e.g., apertures, in the rotor core so that the rods may span between side sections of the same coil or between adjacent coils.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate a nonconducting cylindrical sleeve (insulator tube) 52 that provides slidable bearing surface and thermal isolation between the rotor core and the tension rod.

The axes of the conduits 46 are generally in a plane defined by the racetrack coil. In addition, the axes of the conduits are perpendicular to the side sections of the coil to which are connected the tension rods that extends through the conduits. Moreover, the conduits are orthogonal to and intersect the rotor axis, in the embodiment shown here. The number of conduits and the location of the conduits will depend on the location of the HTS coils and the number of coil housings (see FIG. 10) needed to support the side sections of the coils.

The tension rods support the coil especially well with respect to centrifugal forces as the rods extend substantially radially between the sides of the coil winding. Each tension rod is a shaft with continuity along the longitudinal direction of the rod and in the plane of the racetrack coil. The longitudinal continuity of the tension rods provides lateral stiffness to the coils which provides rotor dynamics benefits. Moreover, the lateral stiffness permits integrating the coil support with the coils so that the coil can be assembled with the coil support prior to final rotor assembly. Pre-assembly of the coil and coil support reduces production cycle, improves coil support quality, and reduces coil assembly variations. The racetrack coil is supported by an array of tension members that span the long sides of the coil. The tension rod coil support members are pre-assembled to coil.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for superconducting winding: (i) "warm" supports and (ii) "cold" supports. In a warm support, the supporting structures are thermally isolated from the cooled SC windings. With warm supports, most of the mechanical load of a superconducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor.

An individual support member consists of a tension rod 42 (which may be a bar and a pair of bolts at either end of the bar), a channel housing 44, and a dowel pin 80 that connects the housing to the end of the tension rod. Each channel housing 44 is a U-shaped bracket having legs that connect to a tension rod and a channel to receive the coil winding 34. The U-shaped channel housing allows for the precise and convenient assembly of the support system for the coil. A series of channel housings may be positioned end-to-end along the side of the coil winding. The channel housings collectively distribute the forces that act on the coil, e.g., centrifugal forces, over substantially the entire side sections 40 of each coil.

The channel housings 44 prevent the side sections 40 of the coils from excessive flexing and bending due to centrifugal forces. The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The transfer of the centrifugal load from the coil structure to a support rod is through the channel housing that fits around the coil outside surface and side straight sections, and is doweled by pins 80 to a wide diameter end of the tension rod. The U-shaped channel housings are formed of a light, high strength material that is ductile at cryogenic temperatures. Typical materials for channel housing are aluminum, Inconel, or titanium alloys, which are non-magnetic. The shape of the U-shaped housing may be optimized for low weight and strength.

The dowel pin 80 extends through apertures in the channel housing and tension rod. The dowel may be hollow for low weight. Locking nuts (not shown) are threaded or attached at the ends of the dowel pin to secure the U-shaped housing and prevent the sides of the housing from spreading apart under load. The dowel pin can be made of high strength Inconel or titanium alloys. The tension rods are made with larger diameter ends 82 that are machined with two flats 86 at their ends to fit the U-shaped housing and coil width. The flat ends 86 of the tension rods abut the inside surface of the HTS coils, when the rod, coil and housing are assembled together. This assembly reduces the stress concentration at the hole in the tension rod that receives the dowel.

The coil support system of tension rods 42, channel housings 44 and split-clamp 58 may be assembled with the HTS coil windings 34 as both are mounted on the rotor core 22. The tension rods, channel housings and clamp provide a fairly rigid structure for supporting the coil windings and holding the coil windings in place with respect to the rotor core.

Each tension rod 42 extends through the rotor core, and may extend orthogonally through the axis 20 of the rotor. Conduits 46 through the rotor core provide a passage through which extend the tension rods. The diameter of the conduits is sufficiently large to avoid having the hot rotor walls of the conduits be in contact with the cold tension rods. The avoidance of contact improves the thermal isolation between the tension rods and the rotor core.

The rotor core 22 is typically made of magnetic material such as iron, while the rotor end shafts are typically made of non-magnetic material such as stainless steel. The rotor core and end shafts are typically discrete components that are assembled and securely joined together by either bolting or welding.

The iron rotor core 22 has a generally cylindrical shape suitable for rotation within the rotor cavity 16 of the stator 12. To receive the coil winding, the rotor core has recessed surfaces 48, such as flat or triangular regions or slots. These surfaces 48 are formed in the curved surface 50 of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer surface of the coil winding extend to substantially an envelope defined by the rotation of the rotor. The outer curved surfaces 50 of the rotor core when rotated define a cylindrical envelope. This rotation envelope of the rotor has substantially the same diameter as the rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels 116, 118 (FIG. 11) to receive the coil winding and connections 112, 114 to the winding.

The split clamp 58 may be formed of a non-magnetic material, such as aluminum or Inconel alloys. The same or similar non-magnetic materials may be used to form the tension rods, channel housings and other portions of the coil support system. The coil support system is preferably non-magnetic so as to preserve ductility at cryogenic temperatures, since ferromagnetic materials become brittle at temperatures below the Curie transition temperature and cannot be used as load carrying structures.

The split clamp 58 is surrounded by, but is not in contact with collar 62. There is a collar 62 at each end of the rotor core 22, although only one collar is shown in FIG. 3. The collar is a thick disk of non-magnetic material, such as stainless steel, the same as or similar to the material, that forms the rotor shafts. Indeed, the collar is part of the rotor shaft. The collar has a slot 64 orthogonal to the rotor axis and sufficiently wide to receive and clear the split clamp 58. The hot sidewalls 66 of the slot collar are spaced apart from the cold split clamp so they do not come in contact with each other.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region on the end 56 of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts 75 (see FIG. 5) extend through these longitudinal bolt holes 72, 74 and secure the collars to the rotor core.

FIG. 4 is a first cross-sectional view of the rotor core and collar. FIG. 5 is a second cross-sectional view of the rotor and collar that is orthogonal to the first view. The electrical and cooling fluid conduits are shielded by a thin walled tube 76 that extends along the rotor axis from one of the coil end sections 54 and through a collar 62. The cooling conduits in the tube 76 connect to the input and output ports 112 of the cooling passage 38 on the coil winding to the cryogenic transfer coupling 26. An electrical coupling 114 to the coil is provided at same end section of the coil as the cooling coupling 26.

The side sections 40 of the racetrack-shaped coil winding 34 are supported by the series of tension rods 42 that extend through the conduits 46 in the rotor core. The tension rods are nonmagnetic, straight bars that extend between opposite side sections of the same coil, or between side sections of the two coils. The tension rod may be formed of a high strength non-magnetic alloys, such as Inconel X718. The tension rods have at each end a coupling with a channel housing 44 that wraps around and holds the side 40 of the coil winding. The channel housings 44 and the tension rods 42 may provide an adjustment of the tension applied to the side sections of the coil windings. For example, the tension rods may be formed of a tension bar that extends through the rotor core and has at each end a threaded opening to receive a tension bolt. The tension bolts may each have a flat face 86 that abuts the coil winding.

The coil winding 34 is supported by the tension rods 42 (only one of which is shown in FIG. 4) that span opposite side sections 40 of the coil. The channel housing 44 is connected by a dowel pin 80 to the end of the tension rod. For illustrative purposes, the left side of FIG. 6 shows the tension rod without a channel housing. Similarly, the upper side of FIG. 4 shows the tension rod 42 without a channel housing; whereas, the lower side shows a channel housing attached to the tension rod. Tension rods 42 extend through the conduits 46 in the rotor core 22. These conduits have increased diameters at their respective ends 88. These expanded ends 88 receive the insulator tube 52 which is formed as a sleeve on the tension rod. The insulator tubes thermally shield the tension rods 42 from the hot rotor core 22. The channel housing 44 is connected by a dowel pin 80 to the end of the tension rod. For illustrative purposes, the left side of FIG. 6 shows the tension rod without a channel housing. Similarly, the upper side of FIG. 4 shows the tension rod 46 without a channel housing; whereas, the lower side shows a channel housing attached to the tension rod. Tension rods 42 extend through the conduits 46 in the rotor core 22. These conduits have increased diameters at their respective ends 88. These expanded ends 88 receive the insulator tube 52 which is formed as a sleeve on the tension rod. The insulator tubes thermally shield the tension rods 42 from the hot rotor core 22.

As shown in FIG. 5, the conduits 46 extend perpendicularly through the rotor axis and are symmetrically arranged along the length of the core. The number of conduits 46 and their arrangement on the rotor core and with respect to each other is a matter of design choice.

The rotor core may be encased in a metallic cylindrical shield 90 that protects the super-conducting coil winding 34 from eddy currents and other electrical currents that surround the rotor and provides the vacuum envelope as required to maintain a hard vacuum around the cryogenic components of the rotor. The cylindrical shield 90 may be formed of a highly-conductive material, such as a copper alloy or aluminum.

Figure 7:
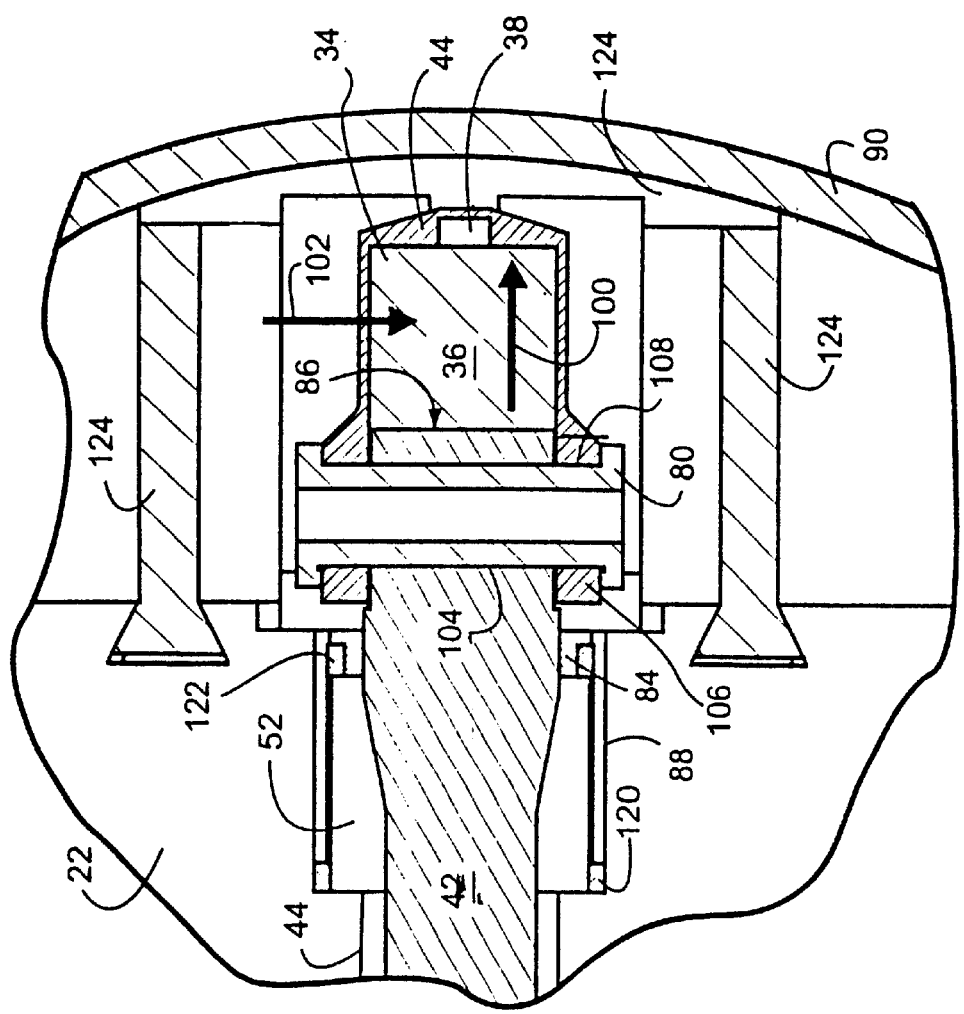
FIG. 7 is an enlarged cross-sectional view of a portion of a coil support structure for the HTS rotor shown in FIG. 3.

The SC coil winding 34 is maintained in a vacuum. The vacuum may be formed by the shield 90 which may include a stainless steel cylindrical layer that forms a vacuum vessel around the coil and rotor core. The FIG. 7 is a cross-sectional diagram taken perpendicular to the rotor axis and showing an enlarged portion of the rotor core 22, tension rod 42, coil winding 34 and associated structures. The flat end 86 of the tension rod abuts an inside surface of the coil winding 34. The opposite end of the tension rod (not shown in FIG. 7) abuts a similar inside surface of the opposite side of the coil winding. Thus, the tension rod spans between the coil winding and provides a fixed surface 86 which supports the coil winding.

Each tension rod 42, although typically cylindrical along its length, has flat ends 86, which permit close attachment to the coil winding and U-shaped channel housing 44. Each tension rod is connected to a channel housing 44 by a dowel pin 80, which prevents the housing from sliding radially outward from the tension rod. The channel housing prevents centrifugal force from bending or warping the coil while the rotor is rotating. Locking nuts (not shown) are threaded at the ends of the dowel pin 80 to secure the housing 44 side legs 106 from spreading apart under load. The dowel pin can be made from high strength Inconel or titanium alloys. Each tension rod 42 fits inside a non-contact conduit 46, such that the tension rod does not intentionally contact the rotor core.

An iron-core rotor is designed to transmit the steady state and transient torques primarily through the rotor body in contrast to the air-core rotor that transmits these torques directly to the rotor winding. However, low level torques are still transmitted to the HTS coil and must be supported by thermally efficient robust thermal insulators 52. The fiber reinforced composite insulator tubes 52 are the thermal insulators that support tangential forces acting on the HTS coil. The insulator tubes are preloaded in compression by retainer nuts 84 threaded on the tension rods. The composite material of the insulator tubes is preferably glass fiber reinforced epoxy resin.

At the end of each tension rod, there may be an insulating tube 52 that fastens the coil support structure to the hot rotor and reduces conduction heat transfer therebetween. Additionally, there may a lock-nut 84 threaded on tension rod 42 that connects to the insulating tube 52, and is used to secure and adjust the position of rod 42 inside the conduit 46. The lock-nut 84 and the tube 52 secure the tension rod and channel housing to the rotor core while minimizing the heat transfer from the hot rotor to the housing structure.

The insulator tube is formed of a thermal insulative material, such as a fiber reinforced composite material. One end of the tube may include an external ring 120 that abuts the wall of the conduit 88. The other end of the tube includes an internal ring 122 that engages the lock-nut 84 secured to an end of the tension rod. An insulator tube and lock-nut are at each end of the tension rod. Heat from the rotor would have to conduct through the length of the insulator tube 52 and the lock nut 84 before reaching the tension rod. Thus, the insulator tube thermally isolates the tension rod from the rotor core.

Figure 8:
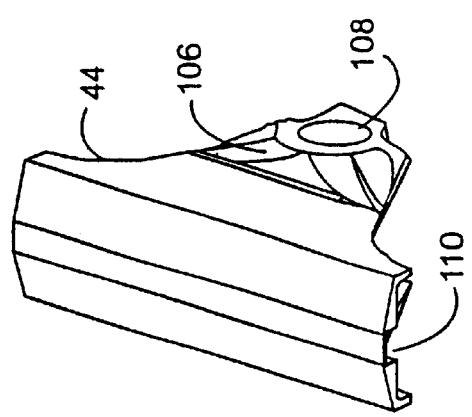
FIG. 8 is a perspective view of a channel housing.

The coil winding is also supported by the channel housing 44 (see FIG. 8). The channel housing supports the coil winding against centrifugal forces (arrow 100 in FIG. 7) and tangential torque forces (arrow 102). The channel housing may be formed of non-magnetic metallic materials, such as aluminum, Inconel, and titanium alloys. The channel housing is held in place on the tension rod by dowel 80 that extends through an aperture 104 in the end of the tension rod. The legs 106 of the channel housing may be thick and have ribs to provide structural support around the apertures 108 that receive the dowel. Centrifugal forces arise due to the rotation of the rotor. Tangential forces may arise from acceleration and deceleration of the rotor, as well as torque transmission. Because the sides 40 of the coil winding are encased by the channel housings 44 and the ends 86 of the tension bars, the sides of the coil winding are fully supported within the rotor.

A support bracket 124 is provided to assist the tension rods and channel housing withstand the large radial forces that can result when a grid fault condition occurs. The radial support may be a rectangular box that fits around the sides 40 of the coil winding and extends over the split-clamp 58. The support bracket include a pair of side walls that are dovetailed into a slot in the recessed surface. The side-walls extend from the rotor core surface 48 to the shell 90 and provides structural strength to the shell.

Figure 9:
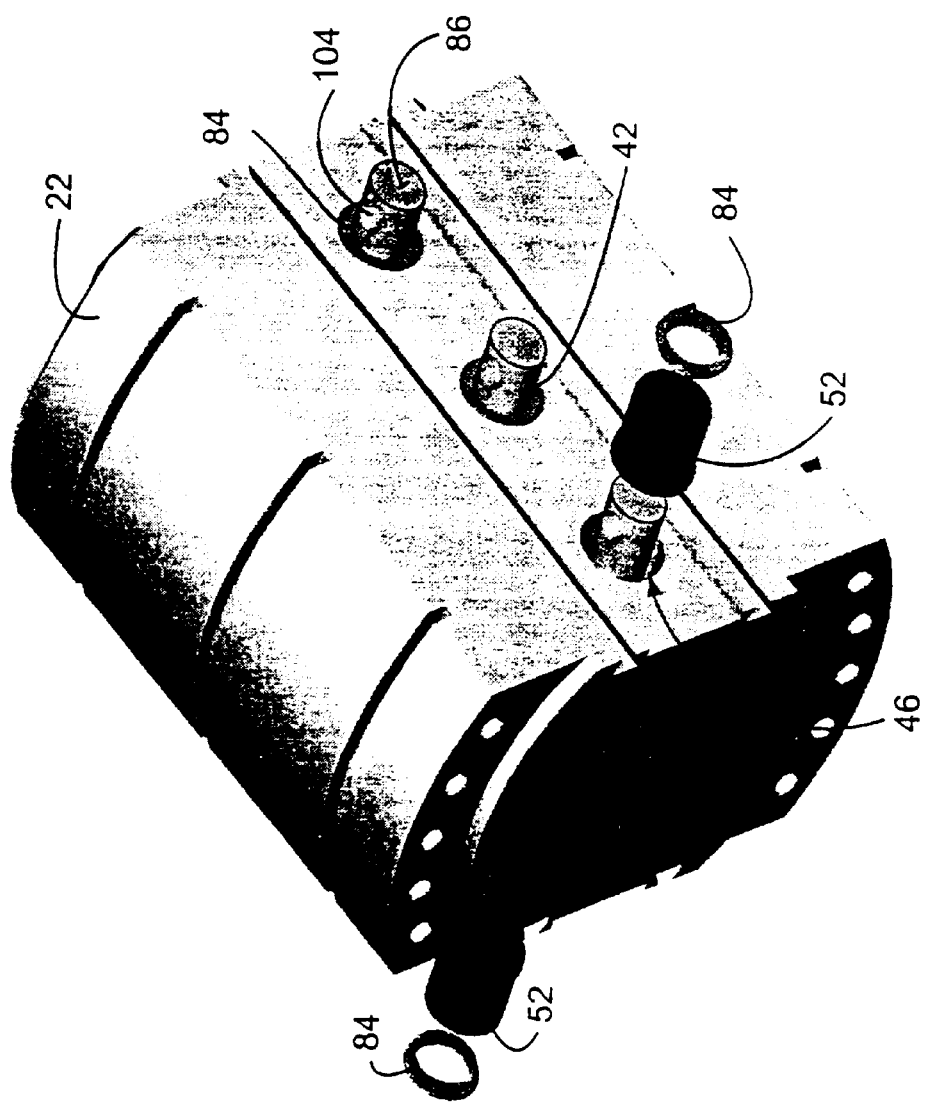
FIGS. 9 to 11 are perspective views showing the assembly process for the HTS rotor shown in FIG. 3.
Figure 10:
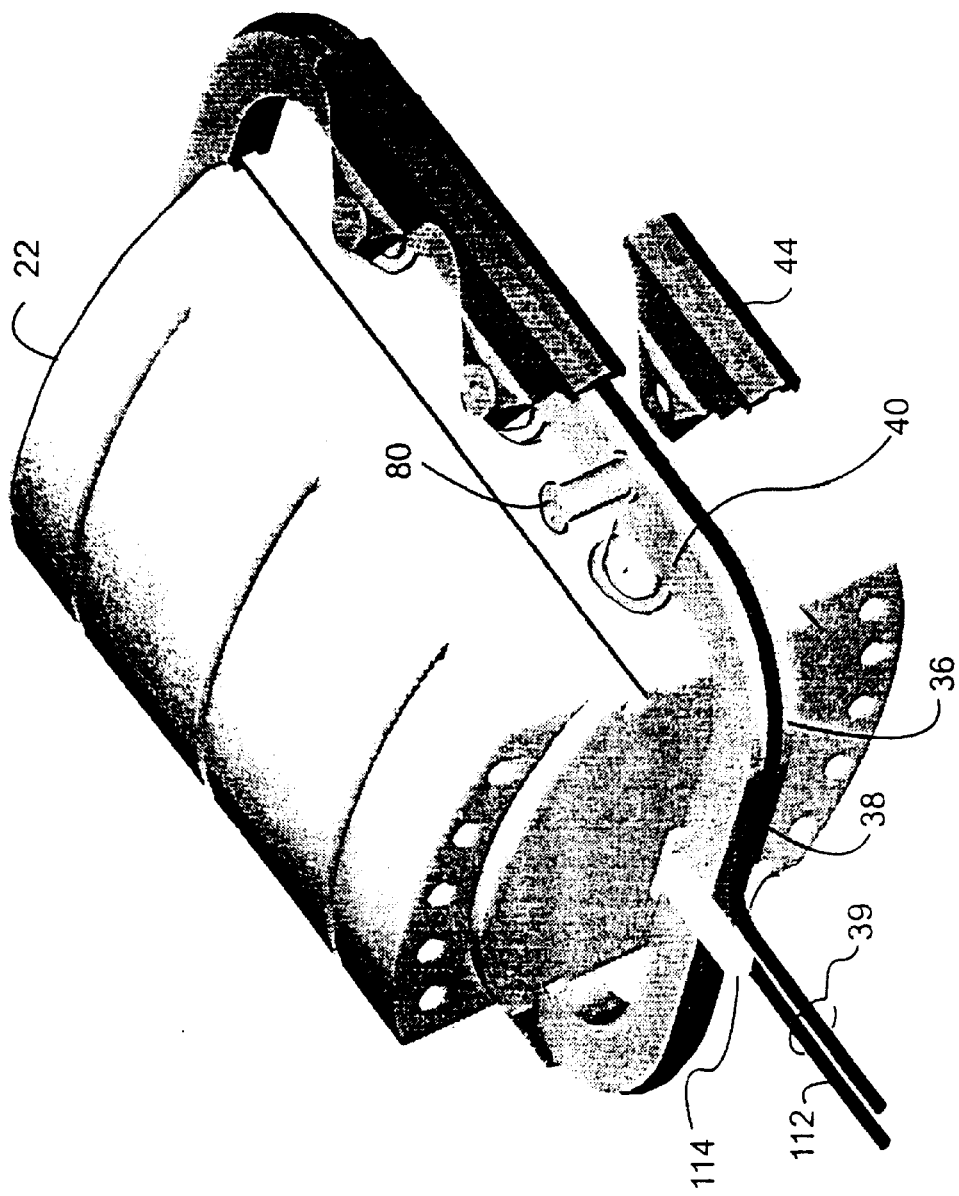
Figure 11:
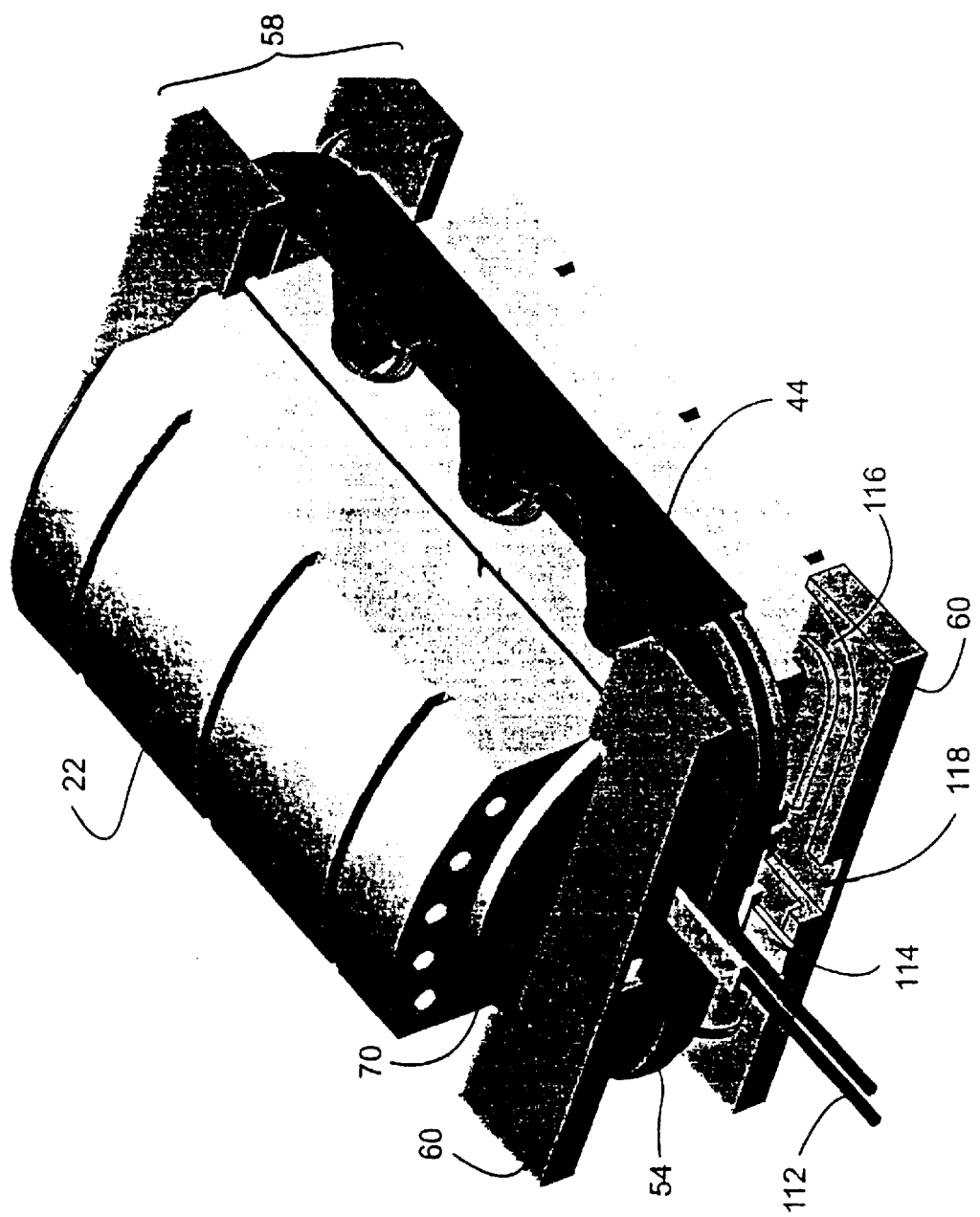

FIGS. 9 to 11 show schematically the assembly process for the coil support structure and coil winding in the rotor. As shown in FIG. 9, before the rotor core is assembled with the collars and other components of the rotor, the tension rods 42 are inserted into each of the conduits 46 that extend through the rotor core. The insulator tube 52 at each end of each tension rod is placed in the expanded end 88 at each end of the conduits 46. The tube 52 is locked in place by a retainer locking-nut 84. When the tension rods are assembled in the rotor core 22, the coil windings are ready to be inserted onto the core.

As shown in FIG. 10, the SC coil 36 is inserted onto the rotor core such that the flat ends 86 of the tension rods 42 abut the inside surface of the side sections 40 of the SC coil. Once the winding has been inserted over the ends of the tension bar, the channel housings 44 are inserted over the SC coil. The channel housings are secured to the ends of the tension bars by inserting dowels 80 through the apertures in the tension rod and channel housing 104, 108, respectively.

The channel housing 44 includes a slot 110 along its upper inside surface which receives the cooling conduit 38 and holds that conduit against the coil 36.

The plurality of channel housings effectively hold the coil in place without affectation by centrifugal forces. Although the channel housings are shown as having a close proximity to one another, the housings need only be as close as necessary to prevent degradation of the coil caused by high bending and tensile strains during centrifugal loading, torque transmission, and transient fault conditions.

The channel housings and tension rods may be assembled with the coil winding before the rotor core and coils are assembled with the collar and other components of the rotor. Accordingly, the rotor core, coil winding and coil support system can be assembled as a unit before assembly of the other components of the rotor and of the synchronous machine.

FIG. 11 shows the assembly of the split clamp 58 that is formed by clamp plates 60. The clamp plates 60 sandwiched between them the end sections 64 of the coil winding. The split clamp provides structural support for the ends of the coil winding 34. The plates 60 of the split clamp include on their inside surfaces channels 116 that receive the coil winding. Similarly, the plates include channels 118 for the input/output lines 112 for the gases and for the input and output current connections 114 to the coil. Once the coil supports, coil, collar and rotor core are assembled, this unit is ready to be assembled into the rotor and synchronous machine.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. In a synchronous machine, a rotor comprising:
    a rotor core having at least one conduit extending through the core;
    a superconducting coil winding extending around at least a portion of the rotor core, said coil winding having a pair of side sections on opposite sides of said rotor core;
    at least one tension rod extending between the pair of side sections of the coil winding and through said at least one conduit of the rotor; and
    an insulator in the conduit thermally separating the tension rod from the rotor.

2. In a rotor as in claim 1 wherein said insulator is a tube having an outside surface in contact with said conduit.

3. In a rotor as in claim 1 wherein said insulator is a tube having an inside surface in contact with an attachment on an end of said rod.

4. In a rotor as in claim 1 wherein the rotor core is a solid core and said conduit extends through the solid core.

5. In a rotor as in claim 1 further comprising an outside ring at one end of the tube in contact with the conduit, and an inside ring at an opposite end of the tube in contact with a lock-nut at the end of the rod.

6. In a rotor as in claim 1 wherein the insulator is formed of a composite fiber material.

7. In a rotor as in claim 1 wherein the insulator is in the conduit and is adjacent an outside surface of the core.

8. In a rotor as in claim 1 further comprising a locking-nut securing the insulator to the conduit in the core.

9. In a rotor as in claim 8 wherein the locking-nut compresses the insulator into the conduit.

10. In a rotor as in claim 9 wherein said insulator is a tube compressed by the lock-nut.

11. In a rotor as in claim 1 wherein said tension rod is formed of a high-strength and non-metallic metal alloy.

12. In a rotor as in claim 1 wherein said tension rod is formed of an Inconel metal alloy.

13. In a rotor as in claim 1 wherein said tension rod extends through a longitudinal axis of the rotor.

14. In a rotor as in claim 1 wherein said at least one tension rod is a plurality of tension rods extending through a plurality of conduits in said rotor core, and said at least one insulator is a tube insulator mounted in each end of said conduits.

15. In a rotor as in claim 1 wherein said tension rod is spaced from rotor walls of the conduits by said insulator.

16. In a rotor as in claim 1 further comprising a coil housing at an end of said tension rod, wherein said housing is attached to said coil winding and is attached to said tension rod.

* * * * *

UNITED STATES PATENT AND TRADEMARK OFFICE
CERTIFICATE OF CORRECTION

PATENT NO. : 6,605,886 B2 Page 1 of 1
DATED : August 12, 2003
INVENTOR(S) : Laskaris It is certified that error appears in the above-identified patent and that said Letters Patent is hereby corrected as shown below:

Column 1,
Line 35, delete "Telsa" and insert -- Tesla -- therefor.

Column 3,
Line 64, delete "Telsa" and insert -- Tesla -- therefor.

Column 8, line 67 to Column 9, line 11,
Delete the remaining text of the paragraph after -- 22. --.

Signed and Sealed this

Twenty-fifth Day of November, 2003

JAMES E. ROGAN
*Director of the United States Patent and Trademark Office*